(12) United States Patent
Collet et al.

(10) Patent No.: US 8,239,902 B2
(45) Date of Patent: Aug. 7, 2012

(54) METHOD AND APPARATUS FOR BANDWIDTH OPTIMIZATION OF A CONTENT ON DEMAND SERVICE

(75) Inventors: Jean-Luc Collet, La Gaude (FR); Francois-Xavier Drouet, La Gaude (FR); Gerard Marmigère, Drap (FR)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 11/426,965

(22) Filed: Jun. 28, 2006

(65) Prior Publication Data

US 2007/0002839 A1 Jan. 4, 2007

(30) Foreign Application Priority Data

Jun. 29, 2005 (EP) .................................... 05300529

(51) Int. Cl.
*H04N 7/173* (2011.01)
(52) U.S. Cl. ........................ 725/101; 370/352
(58) Field of Classification Search .................. 725/101; 370/352
See application file for complete search history.

(56) References Cited

U.S. PATENT DOCUMENTS

| | | | | |
|---|---|---|---|---|
| 5,446,790 A * | 8/1995 | Tanaka et al. | ............... | 381/71.14 |
| 5,592,551 A * | 1/1997 | Lett et al. | ...................... | 380/211 |
| 6,065,061 A * | 5/2000 | Blahut et al. | ................... | 709/239 |
| 7,155,735 B1 * | 12/2006 | Ngo et al. | ...................... | 725/101 |
| 7,305,696 B2 * | 12/2007 | Thomas et al. | ................ | 725/114 |
| 2002/0122656 A1 * | 9/2002 | Gates et al. | ...................... | 386/46 |
| 2002/0184314 A1 * | 12/2002 | Riise | ............................. | 709/205 |
| 2005/0010674 A1 * | 1/2005 | Taniguchi et al. | ............. | 709/231 |
| 2005/0216950 A1 * | 9/2005 | MacInnis | ....................... | 725/135 |
| 2006/0015914 A1 * | 1/2006 | Lee | ............................... | 725/101 |
| 2006/0059090 A1 * | 3/2006 | Lahtinen et al. | ................ | 705/50 |

* cited by examiner

*Primary Examiner* — Pankaj Kumar
*Assistant Examiner* — Sahar Baig
(74) *Attorney, Agent, or Firm* — Hoffman Warnick LLC; Andrea Bauer

(57) ABSTRACT

A method of providing a preview and or replay function for a content on demand service provided by a service provider to a plurality of users. A method in accordance with an embodiment of the invention includes: generating a first stream of content for transmission to a user; generating one or more other streams of content, each of which are derived from the first stream of content and differ therefrom in that the other streams are each in advance of or after the first stream by a time difference; transmitting the first stream of content to the user; receiving a request from the user to view a preview or replay of a part of the content; and switching the user to one of the other streams of content, which other stream is at the time difference that matches the requested preview or replay part of the content.

8 Claims, 7 Drawing Sheets

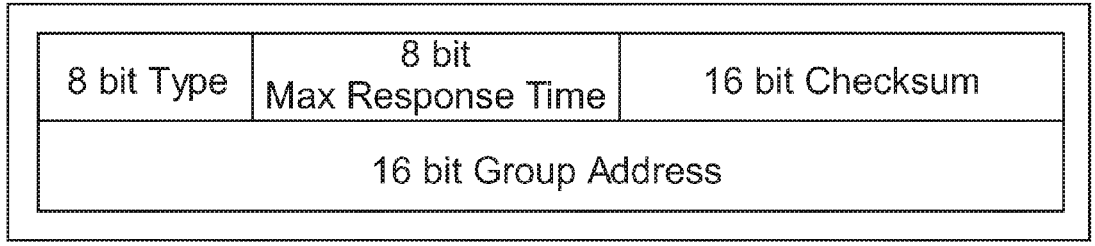

*Figure 2B*

| Hex Value | Message | Description |
|---|---|---|
| 0x11 | Membership Query | These are used by the router to see whether any group members exist. Two types of membership query can be differentiated by the group address in the 32-bit group address field. A general query has a group address in the IGMP header of all zeros, and asks which groups have members on an attached network. A group-specific query returns information on whether a particular group has members. |
| 0x16 | Version 2 Membership Report | When a host joins a multicast group, a membership report is sent to the router to inform the router that a system on the network is listening to multicast messages. |
| 0x17 | Leave Group | The last host of a multicast group inside a subnet must send a leave group message to all routers (224.0.0.2) when it leaves a group. A host may remember the hosts of the multicast group (received in membership reports in response to membership queries) so that it knows when it is the last one in the group, but this is not a requirement. If the group members are not remembered, every host leaving a group sends a leave group message. In any case the router checks if it was the last host in the group, and stops forwarding multicast messages if so. |
| 0x12 | Version 1 Membership Report | This report is used for compatibility reasons with IGMP v1. |

*Figure 2C*

METHOD AND APPARATUS FOR BANDWIDTH OPTIMIZATION OF A CONTENT ON DEMAND SERVICE

FIELD OF THE INVENTION

The present invention is directed to the field of Time shift TV (TSTV), and more particularly to a method and system for bandwidth optimization in a TSTV service.

BACKGROUND OF THE INVENTION

A video on demand (VOD) service relies on a network Internet Protocol (IP) infrastructure and is generally based on three main components.

The first component is the head end equipment which is the platform responsible for presenting the live content available to the user and may include managing the dynamic information coming from a broadcaster for an Electronic Programming Guide (EPG). The head end may also provide the administration services for the encoders/transcoders used to transmit the video streams to the users.

The second component is the middleware equipment which ensures the digital content delivery and provides the portal and services such as VOD that could be installed close to the Digital Subscriber Line Access Multiplexer (DSLAM), which is the component responsible for connecting the PSTN line to the IP Backbone of the provider. The user could use the middleware to provide certain video services.

The third component is the end-user equipment which includes the elements installed at the point at which the content is viewed by a user. This may include such elements such as a residential gateway (Modem), a Set Top Box (STB), an IP or Analogue phone and a PC. Video services may be provided in the STB or the PC or in some other way.

The combination of the three components is called the "triple play" model and could be relevant in different environments such as mobile phones, PDAs and car embedded devices.

A broadcast system such as that described above is based on a multicast mechanism (one to many connections) and uses the IP Group Multicast Protocol RFC1112 to manage the user requests. Users requesting the streaming of the same Video are brought together to become members of a unique IP Multicast group (IPMG).

On the other hand a Video on Demand service is based on a unicast mechanism (one to one connections) and uses the Real Time Streaming Protocol (RTSP) (see RFC 2326). When a user wants to view a video, a unicast peer to peer session is created between user equipment and a Video server. The means used to manage the interaction with the video such as "Pause", "Fast backward", "Fast forward" and "Play" is handled by the RTSP. A Unicast peer to peer session leads to a huge number of sessions which may be very expensive in terms of bandwidth and server charges but give greater user flexibility in terms of viewing capabilities and functions.

With respect to multicast broadcasts there are also some advantages and disadvantages. In a multicast session the users must all start the video streaming at the same time and the VCR functions described above (i.e. "Pause", "Fast backward", "Fast forward" and "Play") are no longer available.

Real Time Streaming Protocol (RTSP) is an Internet Engineering Task Force (IETF) proposed standard for controlling streaming media (see RFC 2326). It describes a set of messages that enable the efficient delivery of streamed multimedia over Internet Protocol (IP) networks.

RTSP works with established protocols, such as the Real Time Transport Protocol (RTP—see RFC 1889) and Hypertext Transfer Protocol (HTTP), to provide an integrated approach to streaming media over the Internet.

In VOD service a user makes a request to a server to receive a media stream using VCR-style asset controls such as play, fast-forward, rewind and pause. To implement these actions, the server uses RTSP message pairs which consist of a user request and a server response. One user action can give rise to more than one Time streaming Protocol (TSP) message pair.

FIG. 1 shows the main types of message that may be used in the RTSP protocol.

A user requests a movie with the DESCRIBE and SETUP requests. The server responds with a DESCRIBE response and provides parameters related to the media, such as the audio header and duration. The SETUP message transmits transport parameters and establishes a session with a unique session ID. Once the movie is opened, the user can play it in normal, fast-forward, or rewind mode by sending a PLAY request with a Scale parameter that indicates the mode and speed. A PAUSE request may also be sent to pause the movie. Finally, a TEARDOWN request allows the user to exit from viewing the movie.

As previously indicated IP multicast provides an efficient one-to-many delivery service. To achieve such a delivery using IP unicast traffic, each datagram needs to be sent many times. To achieve one-to-many delivery using IP broadcast traffic, a single datagram is sent, but all nodes process it, even those that are not interested in it. Broadcast delivery service is unsuitable for inter-networks, as routers are designed to prevent the spread of broadcast traffic. With IP multicast, a single datagram is sent and forwarded across routers only to the network segments containing nodes that are interested in receiving it.

Historically, IP multicast traffic has been little utilized. However, recent developments in audio and video teleconferencing, distance learning, and data transfer to a large number of hosts have made IP multicast traffic more important.

The following describes the main details of IP multicast operations.

All multicast traffic is sent to a class D address in the range 224.0.0.0 through 239.255.255.255 (224.0.0.0/4). All traffic in the range 224.0.0.0 through 224.0.0.255 (224.0.0.0/24) is for the local subnet and is not forwarded by routers. Multicast-enabled routers forward multicast traffic in the range 224.0.1.0 through 239.255.255.255 with an appropriate Time to Live (TTL). A specific multicast address is called a group address.

The set of hosts that wish to receive multicast traffic at a specific group address is called a multicast group or host group. Multicast group members can receive traffic at their unicast address and the group address. Multicast groups can be permanent or transient. A permanent group is assigned a well-known group address. An example of a permanent group is the all-hosts multicast group, awaiting traffic on the well-known multicast address of 224.0.0.1. The membership of a permanent group is transient, only the group address is permanent.

There are no limits on the size of a multicast group. A host can send multicast traffic to the group address without belonging to the multicast group. There are no limits to how many multicast groups a host can belong to. There are no limits on when members of a multicast group can join and leave a multicast group. There are no limits on the location of multicast group members. IP multicast must be supported by the hosts and the routers of an IP inter-network.

IGMP is used by IP hosts to report group memberships to any neighbouring routers that are multicast enabled. IGMP is implemented in the IP module as shown if FIG. 2A. IGMP messages are generally encapsulated in IP datagrams.

An IGMP v2 message consists of 64 bits, and contains the type of the message, a maximum response time (used only for membership queries), a checksum, and the group address as is shown in FIG. 2B.

The message types used for communication between a host and a router are defined by the first 8 bits of IGMP v2 message headers, and are shown in FIG. 2C.

In all VOD services the best utilisation of bandwidth is a permanent quest. Also it is a fact that there are surges and troughs in the bandwidth requirements of users. For example at certain times of the day or for certain events demand will be high.

It is now possible to record TV live (TSTV) and watch the same later at a time which suits the user. This is sometimes referred to as the NPVR (network personal video recorder) function. This solution is based on VOD technology in which a channel is recorded and then each user forms connects via a unicast connection to the server to watch the recorded channels. For a live football match several million users may want to watch. Also if a goal is scored or a good save is made many viewers may simultaneously wish to replay sections of the match. This requires a very high demand for bandwidth at those times. Current systems are simply unable to handle the demand and thus replay can not be offered as a service by most providers. If any service of this type is provided there are often severe restrictions, costs or delays.

As indicated a TSTV service is one in which a viewer watches a program at a time which the user chooses. For example, the user may wish to watch a certain program but is not going to be in at the scheduled time for the broadcast of that program. Thus the user has the program recorded and stored at either the service provider end or the user end. When the user is ready to watch the program the stored program is replayed on demand. It will thus be appreciated that the manner in which TSTV is provided to the user is essentially identical to the manner in which VOD is provided to the user. Accordingly reference to VOD and TVTS in terms of the function of the present invention are essentially interchangeable and are intended to be construed thus.

SUMMARY OF THE INVENTION

The present invention provides a VOD system or service which can provide a replay facility in situations of high bandwidth demand.

The present invention is directed to the method and system as defined in the independent claims.

More particularly the present invention discloses a method of providing a preview and or replay function for a content on demand service provided by a service provider to a plurality of users, the method comprising: generating a first stream of content for transmission to a user; generating one or more other streams of content, each of which are derived from the first stream of content and differ therefrom in that the other streams are each in advance of or after the first stream by a time difference; transmitting the first stream of content to the user; receiving a request from the user to view a preview or replay of a part of the content; and switching the user to one of the other streams of content, which other stream is at the time difference that matches the requested preview or replay part of the content.

Further embodiments of the invention are provided in the appended dependent claims.

The advantages of the present invention are set out below and a further detailed in the specific description of the present invention.

BRIEF DESCRIPTION OF THE DRAWINGS

Reference will now be made by way of example to the accompanying drawings, in which:

FIG. 2B is a second IGMP message.

FIG. 2C is a table showing message types between a host and a router.

DETAILED DESCRIPTION OF THE DRAWINGS

Figure 1:
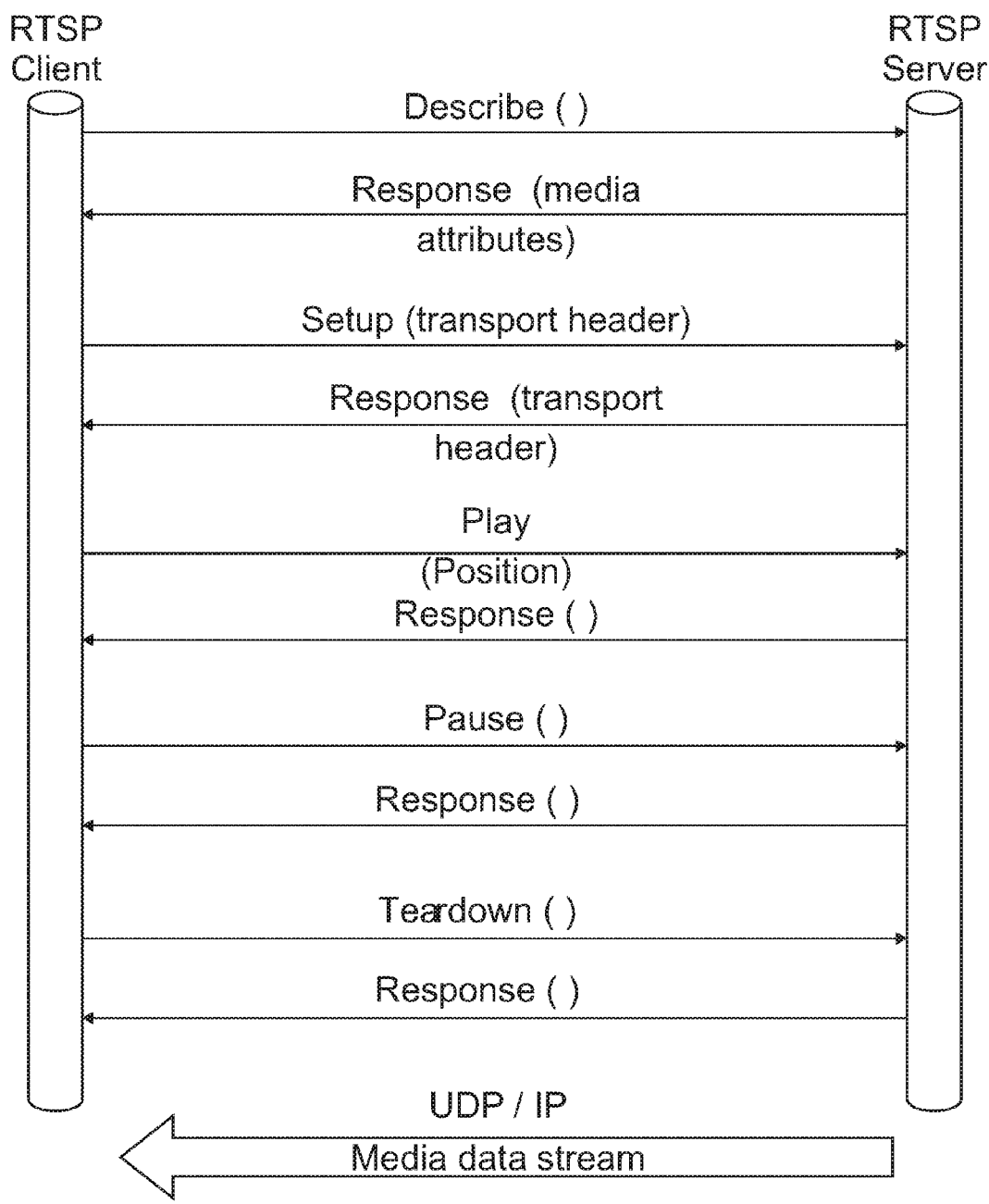
FIG. 1 is a diagram showing the main messages used in the RTSP protocol.
Figure 2A:
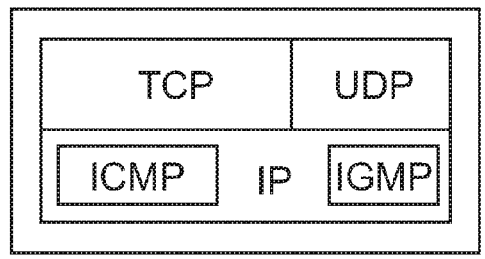
FIG. 2A is an example of an IGPM message encapsulated in a datagram.

For clarity each element of a given drawing starts with the number which corresponds to that drawing. For example, element 100 is in FIG. 1 and element 400 is in FIG. 4. Accordingly some elements may have more than one reference numeral.

Figure 3:
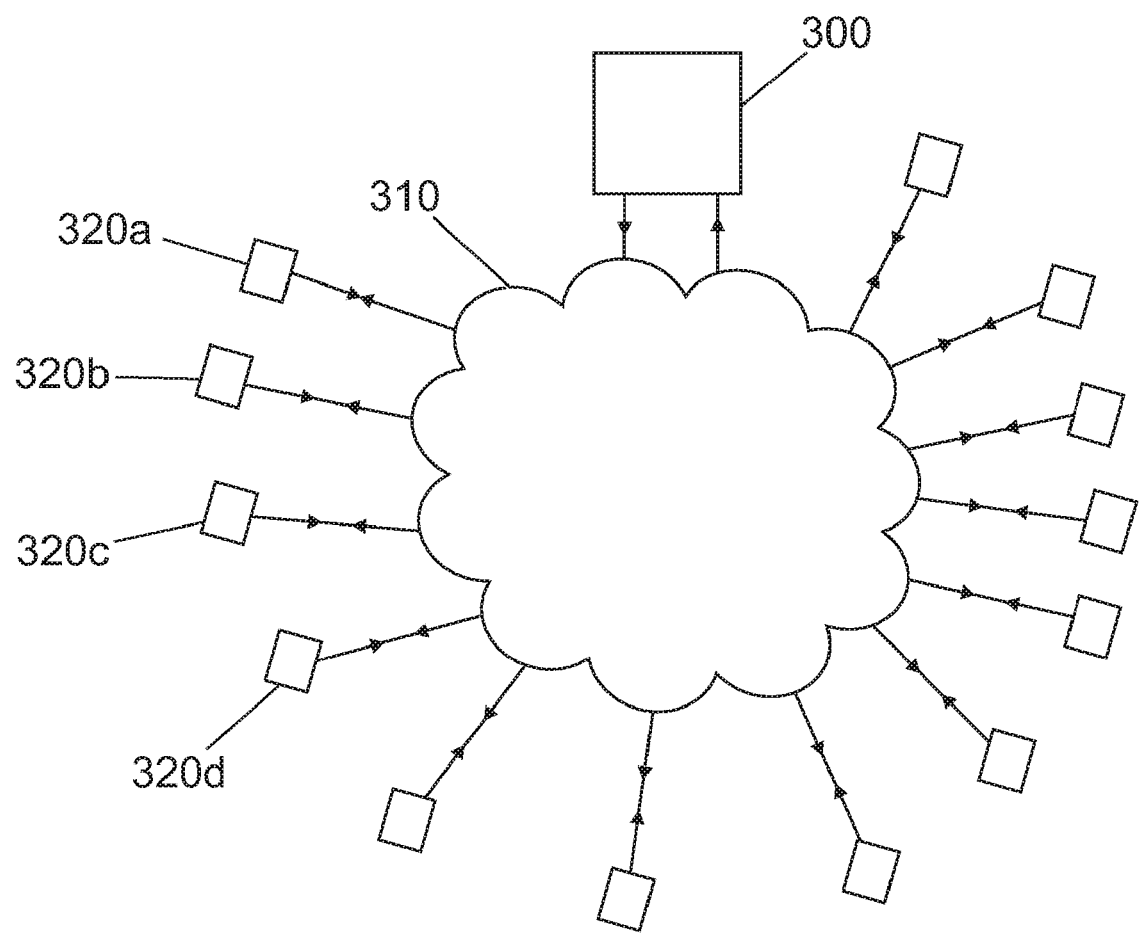
FIG. 3 is a high level diagram showing a VOD system according to the present invention.

Referring now to FIG. 3 a very high level illustration of a TV Broadcast (TVB) system is shown. The system includes a server 300 connected to a network 310. There are also a plurality of remote users 320a, 320b, 320c, etc. connected to the network. A remote user, for example 320c, requests a video from the server 300. The server 300 process the request and connects the user to the required service and transmits the same as a multicast transmission. The users may be watching a live broadcast or a recorded broadcast, at a time that suits them.

As previously indicated in these types of services it is generally possible for the user to transfer to a unicast connection, in order to have VCR type functions. These require a considerable amount of bandwidth and are not generally an attractive option for the service provider.

The present invention provides VCR type functions for a TV program broadcast over TVB system which operates in the multicast mode and not the unicast mode. Accordingly, when a user requests such a function the RTSP protocol will not be used and the IGMP command protocol will be used instead. The ability to replay sections of the video being viewed by the user is provided by providing a live channel and a set of derived sub-channels each created on a different IP ports. The live channel is a channel which is either live or pre-recorded and being watched by a user at a time that suits the user, rather than a scheduled time per se, although it may also be at a scheduled time.

In a TV broadcast it assumed for this explanation that 4 channels are delivered to a user. For example, TF1, FR2, FR3 and Arte. Each channel is delivered on an IP address broadcast and a port an example of this is shown below:

| | |
|---|---|
| TF1 | 255.10.10.1:6001 |
| FR2 | 255.10.10.2:6001 |
| FR3 | 255.10.10.3:6001 |
| Arte | 255.10.10.4:6001 |

The port is indicated as 6001 and the IP addresses are the numbers commencing 255.

In one embodiment the sub-channels are derived from one (or more) of the live channels by means of a delay in time. For example, there may be several sub-channels each delayed from (or in advance of) the live channel by a different amount of time.

Figures 4, 5:
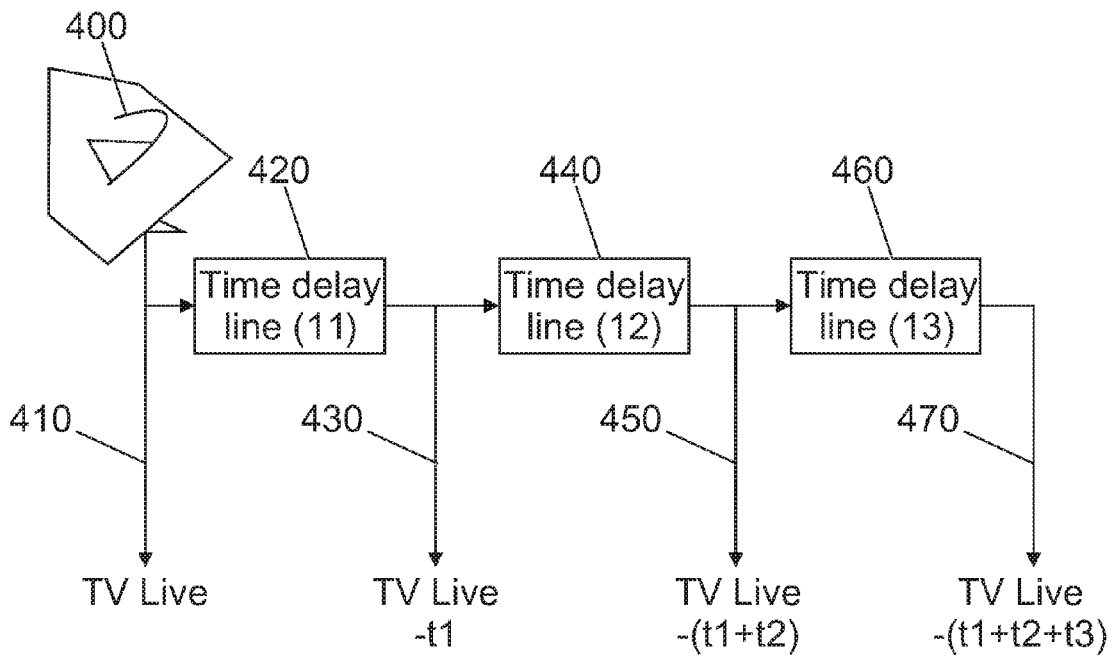
FIG. 4 is a diagram showing the detailed elements of the present invention.
FIG. 5 is a channel table showing IP addresses used to carry out the present invention.

This is described in more detail with reference to FIG. 4. A TV live broadcast 400 is transmitted to users via a multicast transmission 410. The broadcast 400 is simultaneously passed to a time delay element 420 which imposes a time delay of t1. The resulting delayed TV is broadcast via a second multicast transmission 430. A user may thus view the TV live (410) or the TV live corresponding to the current time minus t1 (420). Each delayed transmission may similarly be passed to further delay elements 440, 460 to create further new multicast transmissions or channels 450, 470, respectively. In FIG. 4 the channels 450 and 470 are delayed respectively by current time minus (t1+t2) and current time minus (t1+t2+t3). Any user wishing to connect to a channel or multicast transmission will form part a respective multicast group.

Referring now to FIG. 5 a channel table 500 shows the name of the channel (Max SubCh) 560 and the channels (live) 510 and sub-channels (live-t, live-2t, live-3t) 515, 520 and 525, respectively. For the four TV channels mentioned above (TF1, FR2, Fr3 and Arte) 535, 540, 545, 550 there are a number of IP addresses identified. For some channels there are only one sub-channel for others there are two or three and indeed there may be more depending on available bandwidth. In this channel table each channel and sub-channel is represented by a different IP address.

Figure 6:
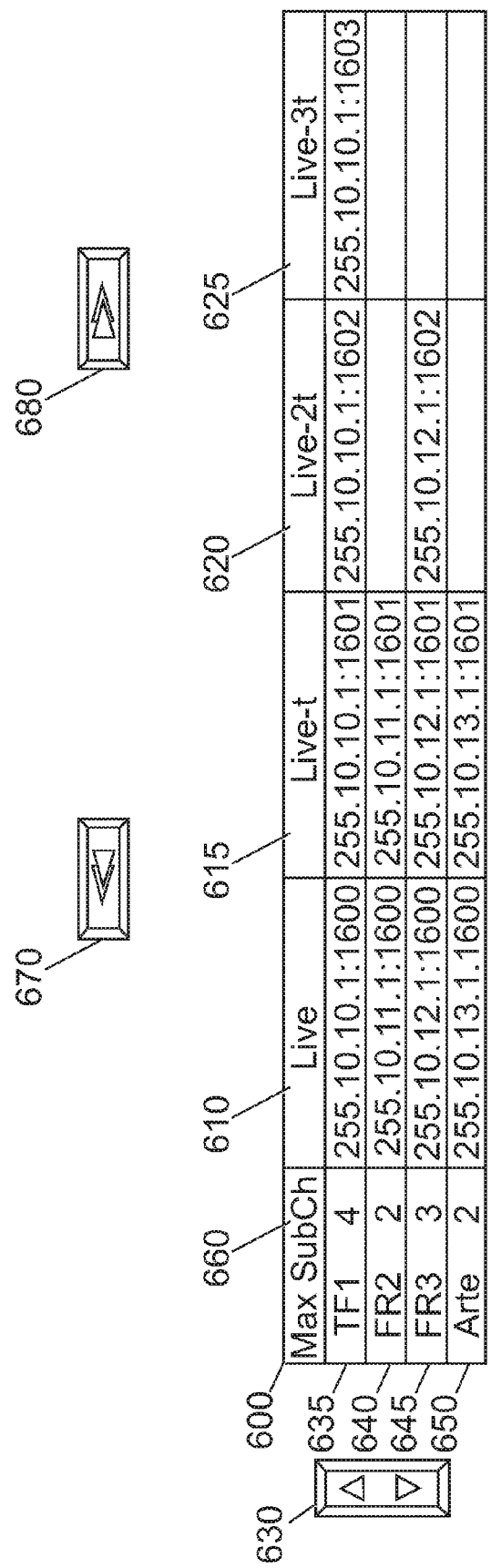
FIG. 6 is another channel table showing IP address used to carry out the present invention.

FIG. 6 shows an alternative channel table 600. This also shows the list of channels (max SubCh) 660 and the channels (live) 610 and sub-channels (live-t, live-2t, live-3t) 615, 620, and 625, respectively. In channel table 600 each channel is represented by a broadcast IP address and each sub-channel is represented by different ports associated therewith.

FIGS. 5 and 6 are shown by way of example and it will be understood that the channels and sub-channels may be represented in different ways.

Figure 7:
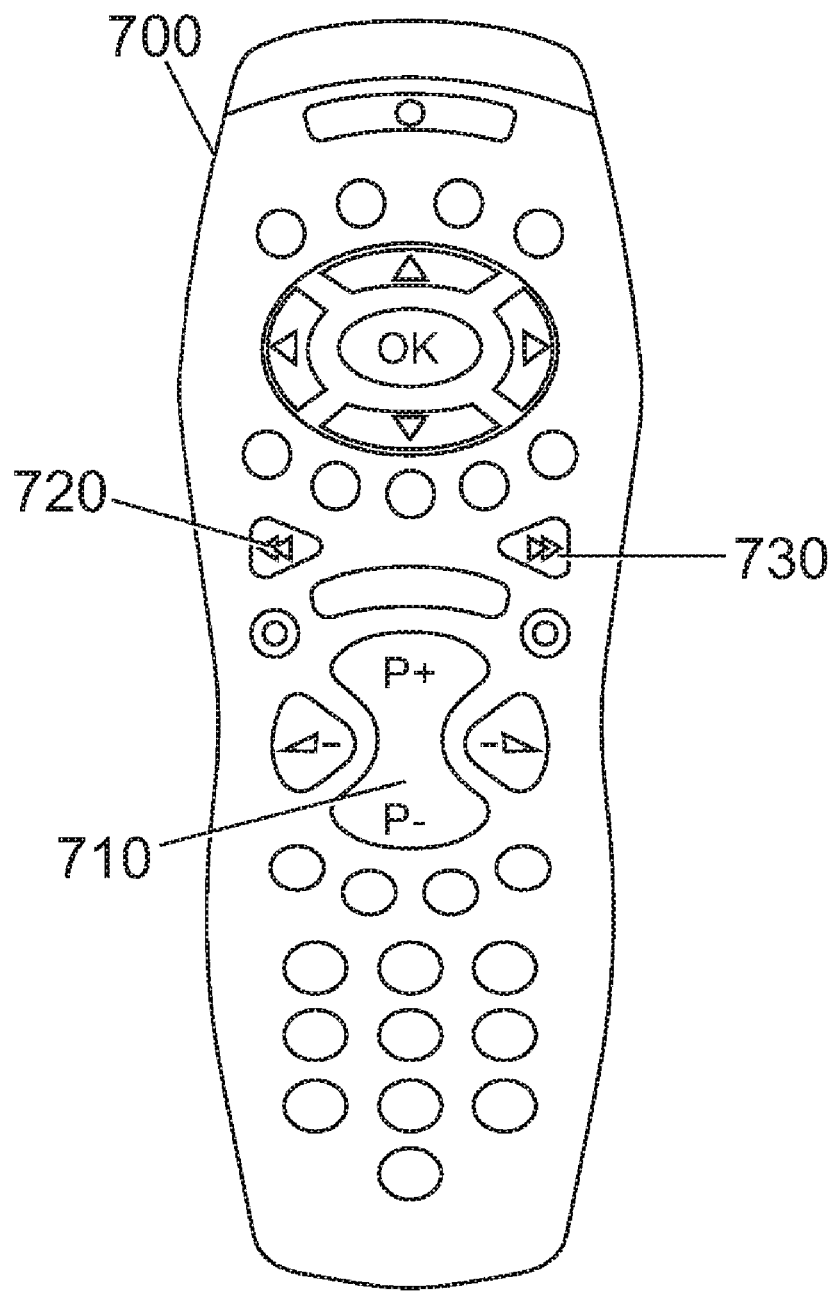
FIG. 7 is a diagram showing a remote controller adapted for use in accordance with the present invention.

As shown in FIG. 7, the user may change channel or sub-channel using a remote controller 700 that controls a set top box (STB) (not shown). The user is able to change between the TV channels (TF1, FR2, FR3 and Arte) using the program selector buttons (P+) and (P−) 710. In addition the user may move from a channel at current time to a channel at a time difference before or after the current time. This can be done by using the backwards button (<<) 520 or the forwards button(>>) 530. These functions are shown by way of example and would be intrinsically simple for the user to understand, however other functions may be adopted.

The request is received at the STB and the user is transferred to the requested sub-channel in the same manner as might be expected when normally changing channels.

Figure 8:
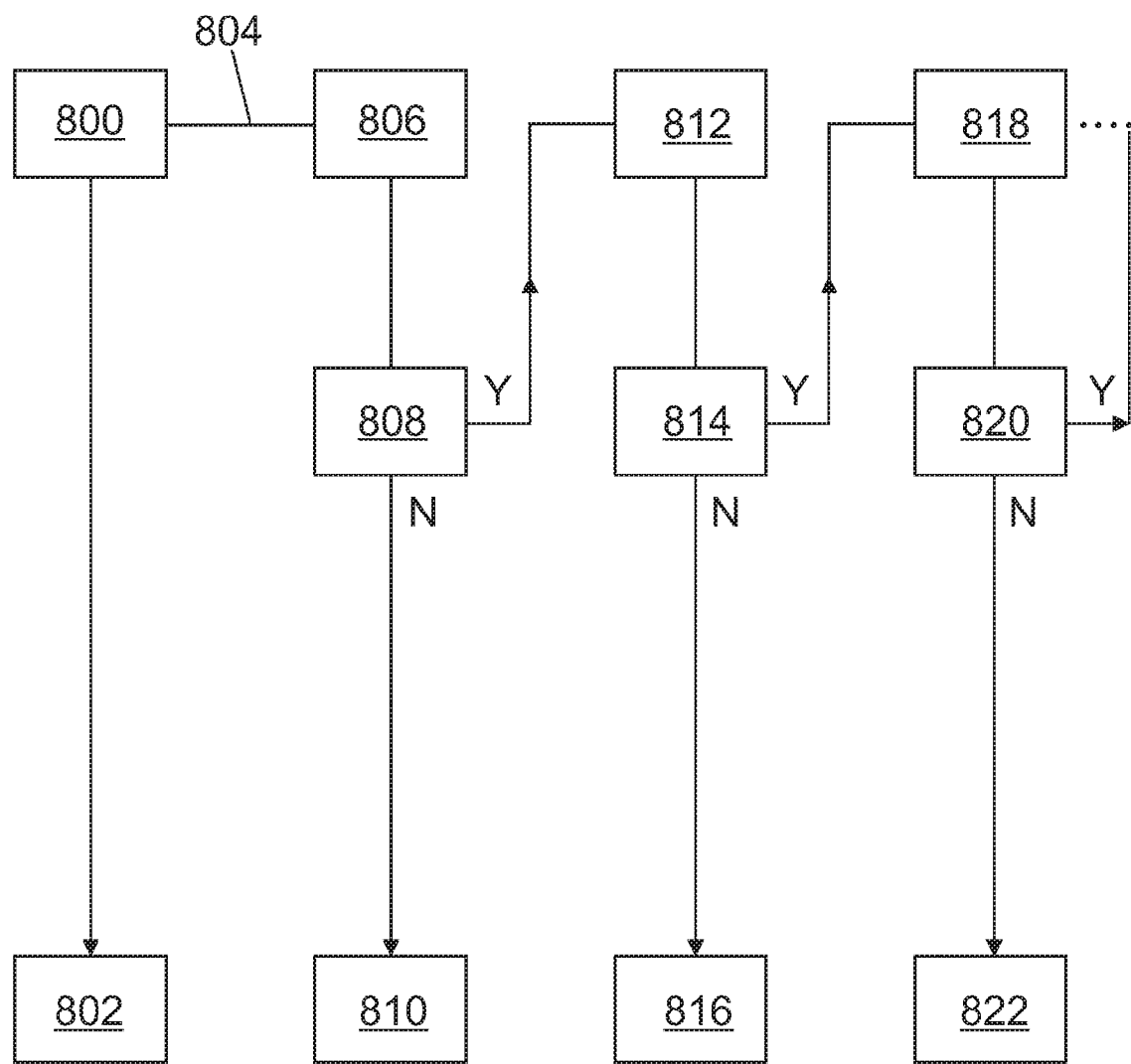
FIG. 8 is a flow chart showing the process of the present invention.

The process of the present invention is now described with reference to the flow chart in FIG. 8. A broadcast commences (step 800), which could be a live broadcast or a broadcast which has been recorded and requested by a user at a time which suits the user. The broadcast is transmitted to a user as a multicast at current time (main Channel) (step 802). At the same time the broadcast is passed (Step 804) through a time delay (Step 806). The time delay produces a multicast broadcast sub-channel (Step 810) which is delayed relative to that at current time by a first predetermined time delay (for example 1 minute, although others delays may be more appropriate depending on the circumstances).

At Step 808 a decision is made as to whether it is necessary to produce a further sub-channel of the original channel. If NO, there is no further action taken other than transmitting the sub-channel. If YES, the broadcast is passed through a second delay (Step 812) and a second multicast sub-channel (step 816) is produced. The produced sub-channel is delayed relative to the main channel and the first sub-channel by a second predetermined delay. The first and second predetermined delays may be the same or may be different.

At Step 814 a decision is made as to whether it is necessary to produce a still further sub-channel of the original channel. If NO, there is no further action taken other than transmitting the sub-channel. If YES, the broadcast is passed through a third delay (Step 818) and a third multicast sub-channel (step 822) is produced. The produced sub-channel is delayed relative to the main channel, the first sub-channel and the second sub-channel by a third predetermined delay. The first, second and third predetermined delays may be the same or may be different.

At Step 820 a decision is made as to whether it is necessary to produce a still further sub-channel of the original channel and the process continues until no further sub channels are sought. The flow chart shows the process for delaying the start of the sub-channels but it will be clear that the sub-channels may also be in advance of the main channel by producing several sub-channels that are formed by storing the main stream and outputting multicast which commence at regular intervals. For example, the video carousel of our co-pending application (FR9 2005 0009) may be useful in this respect and incorporated herein by reference.

While the invention has been particularly shown and described with reference to a preferred embodiment, it will be understood that various changes in form and detail may be made therein without departing from the spirit, and scope of the invention.

The invention claimed is:

1. A method of providing at least one of a preview or replay function for a content on demand service provided by a service provider to a plurality of users, the method comprising:

generating a first multicast stream of content for transmission to a user;

generating one or more delayed multicast streams of content by passing the first multicast stream of content through at least one delay element in a serial chain of delay elements, each of the delayed multicast streams of content are derived from the first multicast stream of content and only differ therefrom in that the delayed multicast streams of content are each in advance of or after the first multicast stream of content by a respective time difference, wherein a first delayed multicast stream of content is derived by passing the first multicast stream of content through a delay element in the serial chain of delay elements simultaneously with a transmission of the first multicast stream of content to the user, and wherein each other delayed multicast stream of content is derived by passing a respective, previously delayed multicast stream of content through at least one additional, different delay element of the chain of delay elements farther down the serial chain of delay elements;

transmitting the first multicast stream of content to the user using a first Internet Protocol (IP) address, wherein the user becomes a member of a first IP multicast group (IPMG);

receiving a request from the user to view a preview or replay of a part of the content; and switching the user to one of the delayed multicast streams of content, wherein the user becomes a member of another IPMG, different from the first IPMG, which delayed multicast stream of content is at the time difference that matches the requested preview or replay part of the content, wherein each of the delayed multicast streams of content is transmitted to the user over a respective IP address, different from the first IP address, or over a respective port associated with the first IP address.

2. The method of claim 1, wherein each delay element provides the same or a different amount of delay.

3. The method of claim 1, further comprising determining a maximum number of delayed multicast streams of content based on bandwidth availability.

4. The method of claim 1, further comprising determining a maximum number of delayed multicast streams of content based on a nature of the content.

5. A system of providing at least one of a preview or replay function for a content on demand service provided by a service provider to a plurality of users, the system comprising:

a system for generating a first multicast stream of content for transmission to a user;

a system for generating one or more delayed multicast streams of content by passing the first multicast stream of content through at least one delay element in a serial chain of delay elements, each of the delayed multicast streams of content are derived from the first stream of content and only differ therefrom in that the delayed multicast streams of content are each in advance of or after the first multicast stream of content by a respective time difference, wherein a first delayed multicast stream of content is derived by passing the first multicast stream of content through a delay element in the serial chain of delay elements simultaneously with a transmission of the first multicast stream of content to the user, and wherein each other delayed multicast stream of content is derived by passing a respective, previously delayed multicast stream of content through at least one additional, different delay element of the chain of delay elements farther down the serial chain of delay elements;

a system for transmitting the first multicast stream of content to the user using a first Internet Protocol (IP) address, wherein the user becomes a member of a first IP multicast group (IPMG);

a system for receiving a request from the user to view a preview or replay of a part of the content; and a system for switching the user to one of the delayed multicast streams of content, wherein the user becomes a member of another IPMG, different from the first IPMG, which delayed multicast stream of content is at the time difference that matches the requested preview or replay part of the content, wherein each of the delayed multicast streams of content is transmitted to the user over a respective IP address, different from the first IP address, or over a respective port associated with the first IP address.

6. The system of claim 5, wherein each delay element provides the same or a different amount of delay.

7. The system of claim 5, further comprising a system for determining a maximum number of delayed multicast streams of content based on bandwidth availability.

8. The system of claim 5, further comprising a system for determining a maximum number of delayed multicast streams of content based on a nature of the content.

* * * * *